Sept. 17, 1929.     C. FARROW     1,728,532
LIGHT HOLDER
Filed May 21, 1928     2 Sheets-Sheet 1
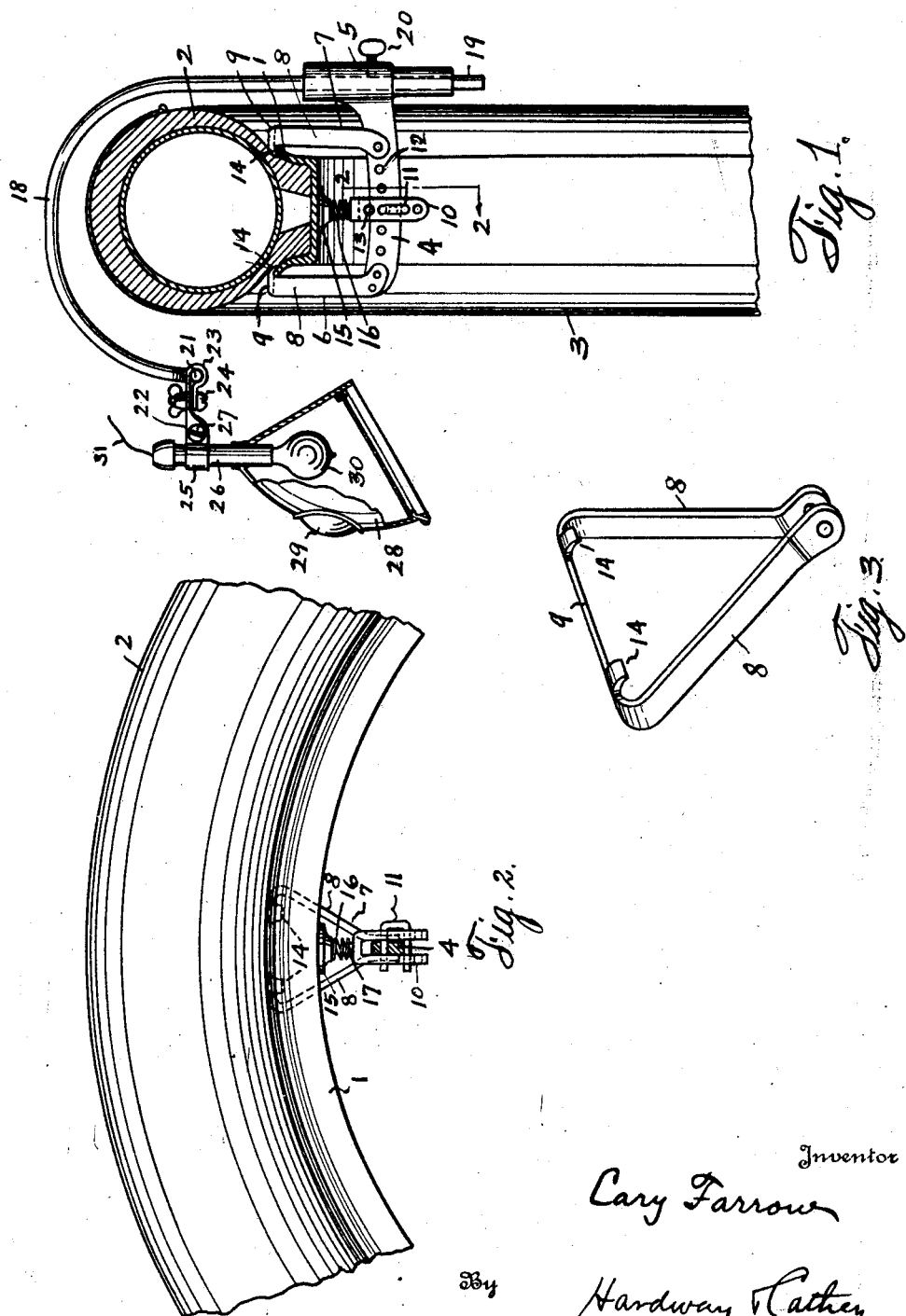

Sept. 17, 1929. C. FARROW 1,728,532
LIGHT HOLDER
Filed May 21, 1928  2 Sheets-Sheet 2
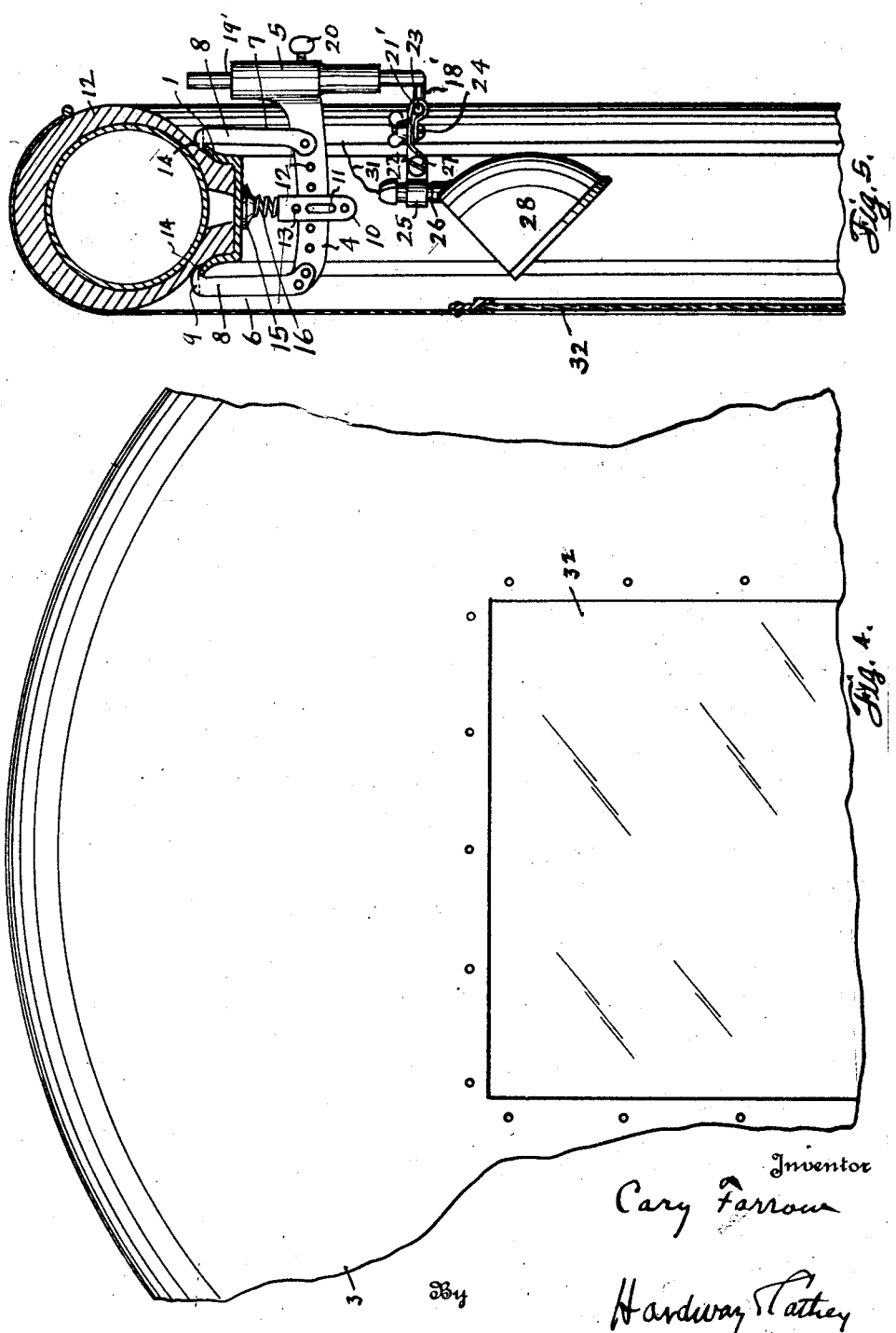

Patented Sept. 17, 1929

1,728,532

UNITED STATES PATENT OFFICE

CARY FARROW, OF HOUSTON, TEXAS

LIGHT HOLDER

Application filed May 21, 1928. Serial No. 279,264.

This invention relates to new and useful improvements in a light holder.

One object of the invention is to provide a holder of the character described specially applicable to the rim of a spare tire, carried by a motor vehicle, and by means of which an electric light housing, and the globe therein may be so held as to reflect the light onto a sign, or advertisement display surface, carried by the tire.

Another object of the invention is to provide a holder of the character described which is readily adjustable so that the light housing, and light may be readily adjusted relative to said display surface.

A further feature of the invention is to provide a device of the character described which is of simple contruction, may be cheaply produced and readily applied to or detached from the tire rim.

With the above and other objects in view, this invention has particular relation to certain novel features of construction, operation and arrangement of parts an example of which is given in this specification and illustrated in the accompanying drawings, wherein:

Figure 1 shows a side elevation of the device, partly in section, as applied to a spare tire rim, and disposed to reflect the light on the rear side of an opaque display surface.

Figure 2 shows a sectional view thereof taken on the line 2—2 of Figure 1,

Figure 3 shows a perspective view of one of the clamp jaws employed,

Figure 4 shows a fragmentary elevation of a form of the device as disposed to reflect the light on the inner side of a translucid display surface, and Figure 5 shows a side elevation of a translucid display surface.

Referring now more particularly to the drawings, wherein like numerals of reference designate similar parts in each of the figures the numeral 1 designates the spare tire rim and the numeral 2 designates the spare tire on said rim. These are of conventional construction. The tire carries a display surface 3 which is adapted to receive advertisements or other display matter.

There is a bracket 4 arranged within, and extending transversely of, the rim 1, whose inner end is provided with a vertically elongated tubular bearing 5. There are the outer and inner clamp jaws 6, 7 of a general triangular form having the side arms 8, 8 connected at one end by the respective cross bars, as 9. The free ends of the arms of the jaw 6 embrace and are rigidly secured to the outer end of the bracket 4 and the free ends of the side arms of the inner jaw 7 embrace the inner end of the bracket 4 and are pivotally connected thereto. There is an, inverted U-shaped yoke 10 whose side arms embrace the bracket 4, and are secured thereto by a U-shaped bolt 11 which extends through suitable transversely aligned bearings in the yoke 10, one of the arms of said U-bolt extending also through the bearing in the bracket 4 and the other arm of said U-bolt fitting against the under side of said bracket. The bracket 4 has a plurality of bearings, as 12, arranged longitudinally therealong to provide for the adjustment of the jaw 7 toward or from the jaw 6. This adjustment may be necessary to accommodate the device to rims of different sizes.

The yoke 10 may be also adjusted radially, on said bracket 4, said yoke having a plurality of bearings 13 to receive the U-bolt 11 to provide for this adjustment. The respective bars 9 have the confronting hooks, as 14, 14, adapted to engage over the corresponding edges of the rim 1.

There is a disc like support 15, which rests against the inner side of the rim and a coil spring 16 is interposed between the outer end of the yoke 10 and the support 15. A stud 17 is carried by said outer end of said yoke over which the adjacent end of the spring 16 fits and the other end of the spring may be attached to the support 15. The spring 16 operates to securely hold the device in place and minimizes the rattling thereof.

There is an outwardly curved arm 18 one end of which forms a stem 19 which fits through the bearing 5 and is adjustably secured therein by set screw 20. The other end of this arm is curved over the tire 2 and its extreme outer end 21 is over turned and a clamp 22 has an inner end clamp bearing 23, which receives said overturned end 21, and which is clamped on said end by the clamp bolt 24.

The clamp has also an outer end clamp bearing 25 whose axis is at right angles to the axis of the bearing 23. The clamp bearing 25 is clamped around the sleeve 26 by means of a clamp bolt 27.

Attached to the sleeve 26 there is a lamp housing 28, of any preferred form, whose rear side carries a colored lens 29. The inner end of the sleeve 26 is formed into a conventional light socket to receive the electric globe 30, in the usual way, said globe being connected with the electric wiring 31, which extends through the sleeve 26.

The housing 28 is so disposed as to cast the light on the display surface 3 and on the advertisement or other display matter thereon.

In applying the device to the tire rim the hooks 14, 14, of the clamp jaw 6 are first engaged over the outer flanges of said rim, and the supporting member 15 then disposed against the inner side of said rim. The hooks 14 of the inner clamp jaw 7 are then forced over the inner flange, of said rim, placing the spring 16 under compression, and this spring then operates to hold all of said hooks 14 in such engagement.

In the form shown in Figure 5 the position of the stem 19' is reversed and its curved arm 18' is arranged behind the translucid section 32, of the display surface, and the clamp 22 is attached to the overturned end 21' of said arm and supports the housing 28 behind said translucid section. The advertising matter, in this form, may be painted, in opaque letters, on the surface 32.

While I have shown what I now consider the preferred form of the invention it is clear that mechanical changes may be made therein and equivalents substituted for the parts shown, the specific structure shown and described being for the purposes of illustration of the principle of the invention.

What I claim is:—

1. A holder including a bracket, clamp jaws pivoted thereto and one of which is adjustable thereon, engaging hooks carried by said jaws, a holder arm adjustably secured to said bracket, a light housing attached to said arm, and a light globe in said housing.

2. A holder including a bracket, clamp jaws attached to said bracket and provided with means adapted to engage the rim of an automobile tire, yieldable means interposed between said bracket and rim and effective to hold said rim engaging means in secure engagement with the rim, a holder arm carried by said bracket, and a housing attached to said arm.

3. A holder including a bracket, clamp jaws attached to said bracket and provided with means adapted to engage the rim of an automobile tire, yieldable means interposed between said bracket and rim and effective to hold the jaws in engagement with the rim, a holder arm carried by said bracket, and a housing attached to said arm and adjustable relative thereto.

4. A holder adapted to be secured to the rim of a vehicle spare tire and including a bracket, clamp jaws attached to said bracket and engageable with said rim, a yieldable member between the bracket and rim which operates to hold said jaws in yieldable engagement with the rim, a holder arm carried by said holder and adjustable relative thereto.

5. A holder adapted to be secured to the rim of a vehicle spare tire and including a bracket, clamp jaws attached to said bracket and engageable with said rim, a yieldable member between the bracket and rim which operates to hold said jaws in yieldable engagement with the rim, a holder arm carried by said holder and adjustable relative thereto, a light housing attached to said arm and a light globe in said housing.

6. A holder adapted to be secured to the rim of a vehicle spare tire and including a bracket, clamp jaws attached to said bracket and engageable with said rim, a yieldable member between the bracket and rim effective to hold said jaws in yieldable engagement with the rim, a holder arm carried by said holder and adjustable relative thereto, a light housing adjustably connected to said arm and a light globe therein.

7. The combination with a spare rim and tire of a motor vehicle, of a display surface carried by said tire, a holder attached to said rim, said holder having rim engaging clamp jaws and means for holding said jaws in yieldable engagement with said rim, and a light housing and light globe therein, said housing and globe being attached to said holder and disposed to cast the light onto the said surface.

In testimony whereof I have signed my name to this specification.

CARY FARROW.